United States Patent
Lee (10) Patent No.: US 12,180,997 B2
(45) Date of Patent: Dec. 31, 2024

(54) BEARING FOR A BICYCLE

(71) Applicant: GLORY WHEEL ENTERPRISE CO., LTD., Taichung (TW)

(72) Inventor: Chien-Hao Lee, Taichung (TW)

(73) Assignee: GLORY WHEEL ENTERPRISE CO., LTD., Taichung (TW)

( * ) Notice: Subject to any disclaimer, the term of this patent is extended or adjusted under 35 U.S.C. 154(b) by 127 days.

(21) Appl. No.: 18/076,572

(22) Filed: Dec. 7, 2022

(65) Prior Publication Data

US 2024/0167507 A1 May 23, 2024

(30) Foreign Application Priority Data

Nov. 21, 2022 (TW) .................................. 111144443

(51) Int. Cl.
*F16C 33/10* (2006.01)
*F16C 17/04* (2006.01)
*F16C 17/10* (2006.01)

(52) U.S. Cl.
CPC .......... *F16C 33/1095* (2013.01); *F16C 17/04* (2013.01); *F16C 17/10* (2013.01); *F16C 2326/26* (2013.01)

(58) Field of Classification Search
CPC .......... F16C 17/04; F16C 17/10; F16C 33/06; F16C 33/08; F16C 33/1095; F16C 2326/26; F16C 2326/28; B62K 21/06; B62M 3/003
See application file for complete search history.

(56) References Cited

U.S. PATENT DOCUMENTS

| 5,320,431 | A | 6/1994 | Kallenberger | |
|---|---|---|---|---|
| 6,663,289 | B1 | 12/2003 | Iljin | |
| 8,684,607 | B2 * | 4/2014 | Kaneko | B60G 15/06 384/420 |
| 11,015,653 | B2 * | 5/2021 | Werner | F16C 35/02 |
| 2009/0302568 | A1 * | 12/2009 | Tsai | B62K 21/06 280/279 |

FOREIGN PATENT DOCUMENTS

| CN | 112268071 A | 1/2021 |
|---|---|---|
| DE | 102018117595 A1 * | 1/2020 |
| TW | 269374 | 1/1996 |

* cited by examiner

*Primary Examiner* — James Pilkington
(74) *Attorney, Agent, or Firm* — Best & Flanagan LLP (57) ABSTRACT

A bearing for a bicycle has an outer collar, an inner collar, and an annular gasket. The outer collar and the inner collar are each made of a material comprising one of a self-lubricating material or a metal coated with a self-lubricating coating. The inner collar is mounted rotatably in the outer collar. The annular gasket is mounted between the outer collar and the inner collar, abuts with corresponding surfaces of the outer collar and the inner collar, and is made of a material having a hardness harder than a hardness of the materials for the inner collar and the outer collar.

18 Claims, 7 Drawing Sheets

BEARING FOR A BICYCLE

FIELD OF INVENTION

The present invention relates to a bearing, particularly to a bearing for a bicycle and having a simplified structure.

BACKGROUND OF THE INVENTION

A bicycle has exercising, casual, and environmental, and transportation functions and is popular. In addition, every rotatable part of the bicycle is usually provided with a bearing to keep the rotation of the rotatable part being smooth. For example, a bearing is mounted between a steam and a head tube of the bicycle. However, the conventional bearing for the bicycle is a ball bearing substantially comprising an outer collar, an inner collar, a ball holder, and multiple balls. Therefore, the conventional bearing has multiple components, is complicated in structure, is high in manufacturing cost, and is high in weight, so is difficult to lightweight the bicycle. In addition, when the rotation between the steam and the head tube is too smooth to cause bicycle faucet over-rotating so as to cause unstable control of the bicycle. Thus, an accident is easily caused.

SUMMARY OF THE INVENTION

The objective of the present invention is to provide a bearing for a bicycle having a simplified structure and can providing a damping effect to the steam and the head tube of the bicycle to keep an accident from being caused and to improve the safety of riding the bicycle.

To achieve the objective, the present invention provides a bearing for a bicycle comprising an outer collar, an inner collar mounted rotatably in the outer collar, and an annular gasket mounted between the outer collar and the inner collar, abutting with corresponding surfaces of the outer collar and the inner collar, and made of a material having a hardness harder than a hardness of the materials for the inner collar and the outer collar.

Wherein the outer collar has an annular recess defined in an inner surface of the outer collar to define a substantially vertical first surface and a substantially horizontal second surface, the inner surface of the outer collar has a third surface connected with the second surface and being substantially vertical to the second surface, the inner collar has an annular protrusion formed around an outer surface of the inner collar to define a substantially vertical first surface corresponding to the first surface of the outer collar in position, and a substantially horizontal second surface corresponding to the second surface of the outer collar in position, and the outer surface of the inner collar has a third surface connected with and being substantially vertical to the second surface of the inner collar and corresponding to the third surface of the outer collar.

Wherein the annular gasket has a continuous bending cross section to define a first segment abutting with the first surfaces of the outer collar and the inner collar, a second segment abutting with the second surfaces of the outer collar and the inner collar, and a third segment abutting with the third surfaces of the outer collar and the inner collar.

Wherein the annular gasket has an L-shaped cross section to define a first segment abutting with the first surfaces of the outer collar and the inner collar, and a second segment abutting with the second surfaces of the outer collar and the inner collar.

Wherein the second surface of the outer collar is a convex surface, the second surface of the inner collar is a concave surface, and the second segment of the annular gasket is curved.

Wherein, the annular gasket is composed of two individual parts including a first part and a second part, the first part of the annular gasket abutting with the first surfaces of the outer collar and the inner collar, and the second part of the annular gasket abutting with the second surfaces of the outer collar and the inner collar.

Wherein, the annular gasket is a flat collar and abuts with the second surfaces of the outer collar and the inner collar.

Wherein, the bearing further comprises a securing collar engaged with the inner surface of the outer collar and abutting with the inner collar.

wherein the outer collar has multiple annular grooves defined in the inner surface of the outer collar, and the inner collar has multiple annular grooves defined in the outer surface of the inner collar.

With the aforementioned features, the structure of the bearing in accordance with the present invention can be simplified, and the manufacturing cost for and the weight of the bearing cab be lowered. A damping effect can be provided under that the inner collar can be rotated smoothly relative to the outer collar. Accordingly, an over-steering can be prevented to keep an accident of the bicycle from being occurred. With the characterization of the material hardness of the gasket being harder than that of the outer collar and the inner collar, an abrasion between the outer collar and the inner collar can be prevented, and the useful life of the bearing is prolonged.

DETAILED DESCRIPTION OF THE PREFERRED EMBODIMENTS

Figure 1:
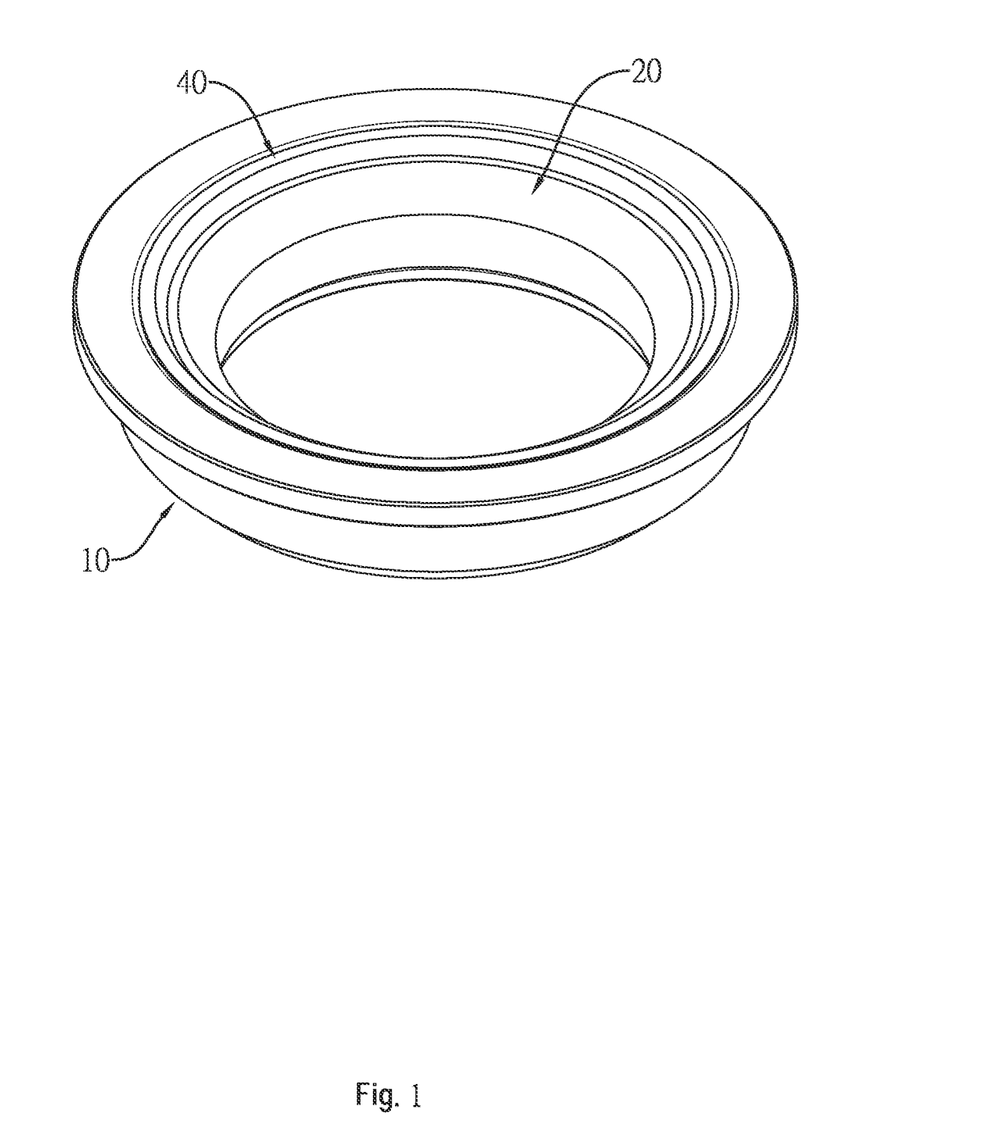
FIG. 1 is a perspective view of a first embodiment of a bearing in accordance with the present invention.
Figure 2:
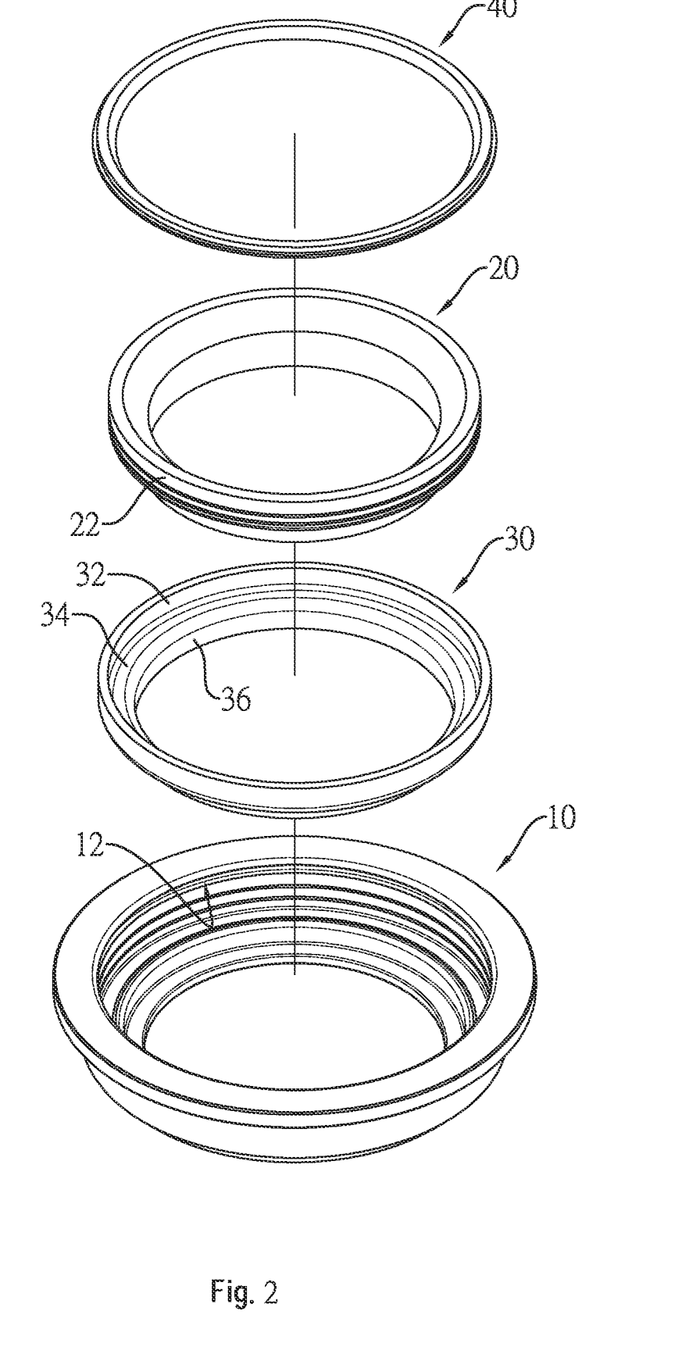
FIG. 2 is an exploded perspective view of the bearing in FIG. 1.
Figure 3:
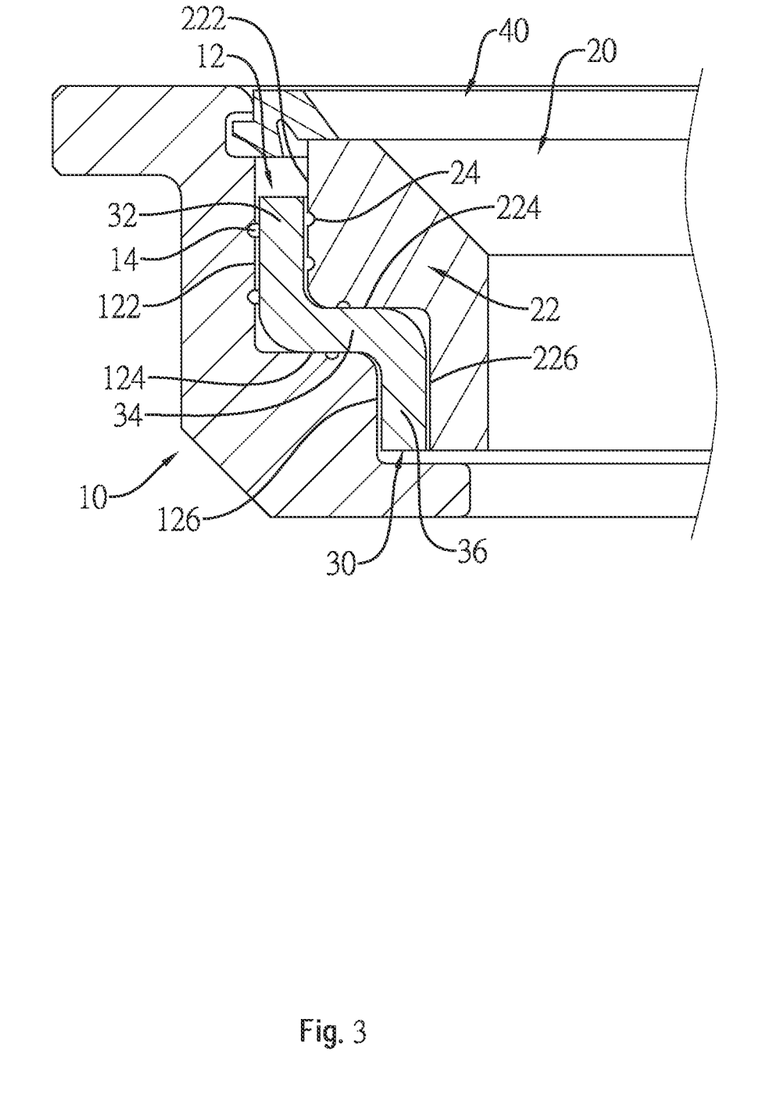
FIG. 3 is an enlarged cross sectional side view of the bearing in FIG. 1.

The present invention is related to a bearing for a bicycle, and the bearing can be applied between a steam and a head tube of the bicycle or another rotational part of a frame of the bicycle. With reference to FIG. 1 to FIG. 3, the bearing in accordance with the present invention comprises an outer collar 10, an inner collar 20, an annular gasket 30, and a securing collar 40. The inner collar 20 is mounted rotatably in the outer collar 10. The outer collar 10 or the inner collar 20 each comprise a material that may be either a self-lubricating material, or a metal coated with a self-lubricating coating layer, such as Teflon or lubrication oil on the inner surface of the outer collar 10 or the outer surface of the inner collar 20. The outer collar 10 has an annular recess 12 defined in an inner surface of the outer collar 10 to define a substantially vertical first surface 122 and a substantially horizontal second surface 124. A third surface 126 connected with the second surface 124 and being substantially vertical to the second surface 124 is formed on the inner surface of the outer collar 10. The inner collar 20 has an annular protrusion 22 formed around an outer surface of the inner collar 20 to define a substantially vertical first surface 222 and a substantially horizontal second surface 224. The first surface 222 corresponds to the first surface 122 of the outer collar 10 in position. The second surface 224 corresponds to the second surface 124 of the outer collar 10 in position. A third surface 226 connected with and being substantially vertical to the second surface 224 is formed on the outer surface of the inner collar 20 and corresponds to the third surface 126 of the outer collar 10 in position. Alternately, the protrusion 22 may be formed on the inner surface of the outer collar, and the recess 12 may be defined in the outer surface of the inner collar 20.

The annular gasket 30 is mounted between the outer collar 10 and the inner collar 20, abuts with corresponding surfaces 122, 124, 126, 222, 224, 226 of the outer collar 10 and the inner collar 20, and is made of a material having a hardness harder than a hardness of the materials for the inner collar 10 and the outer collar 20. Preferably, the gasket 30 may be made of stainless steel, tinplate, or high-carbon steel. In the first embodiment of the present invention, the annular gasket 30 has a continuous bending cross section to define a first segment 32, a second segment 34, and a third segment 36. The first segment 32 abuts with the first surfaces 122,222 of the outer collar 10 and the inner collar 20. The second segment 34 abuts with the second surfaces 124, 224 of the outer collar 10 and the inner collar 20. The third segment 36 abuts with the third surfaces 126,226 of the outer collar 10 and the inner collar 20.

Accordingly, with the characterization of the material for the outer collar 10 and the inner collar 20, the inner collar 20 is rotatable related to the outer collar 20 and a damping effect is provided between the collars 10, 20 to keep the rotation speed and the rotation angle of the inner collar 20 relative to the outer collar 20 from being over a desired range. For example, when the bearing in accordance with the present invention is mounted between a steam and a head tube of a bicycle, the outer collar 10 is mounted securely in the head tube, and the steam is mounted through the inner collar 20. Thus, the rotation speed of the steam relative to the head tube can be limited to prevent an accident for occurring due to an over-steering of the steam. In addition, because the annular gasket 30 is made of a material having a hardness harder than a hardness of the materials for the inner collar 20 and the outer collar 10, the smoothness of the rotation between the inner collar 20 and the outer collar 10 can be improved, and abrasion of the outer collar 10 and the inner collar 20 can be prevented due to the abutment of the outer collar 10 and the inner collar 20. Accordingly, the useful life of the bearing can be prolonged.

The securing collar 40 is engaged with the inner surface of the outer collar 10 and abutting with the inner collar 20 to keep the inner collar 20 and the annular gasket 30 from be detached from the outer collar 10 so as to keep the structure of bearing in a stable condition. Alternately, the securing collar 40 is unnecessary for the bearing in accordance with the present invention. At this time, the inner collar 20 is kept from being detached from the outer collar 10 by a structure of a tube of the bicycle.

Figure 4:
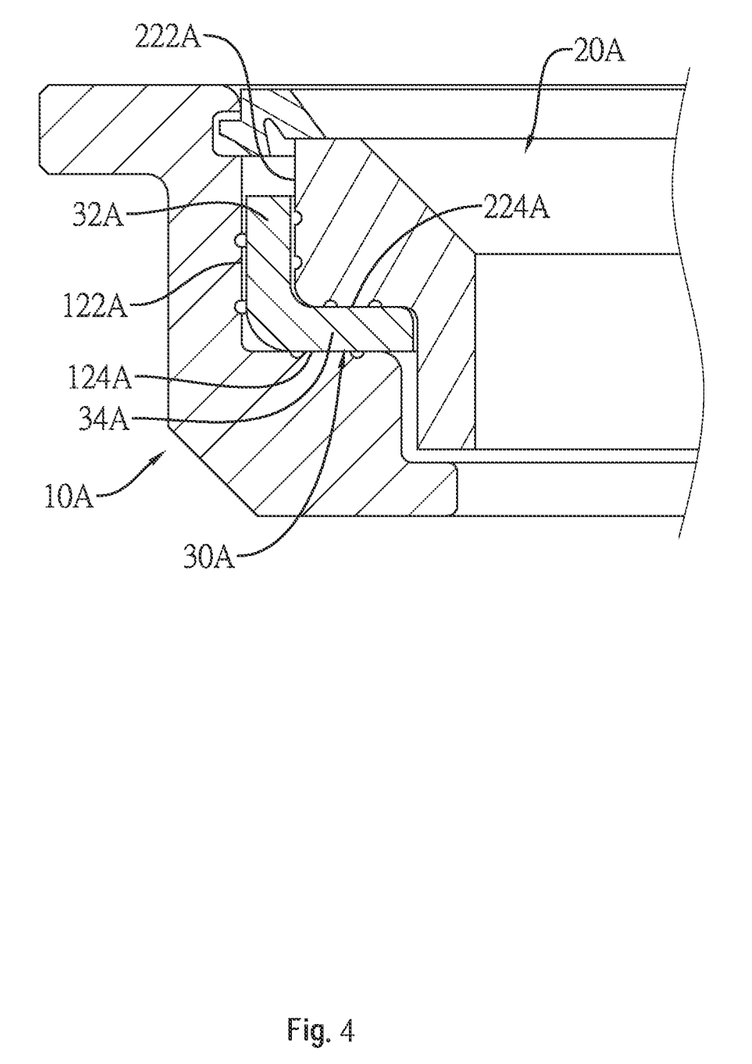
FIG. 4 is an enlarged cross sectional side view of a second embodiment in accordance with the present invention.

With reference to FIG. 4, the annular gasket 30A has an L-shaped cross section to define a first segment 32A and a second segment 34A. The first segment 32A abuts with the first surfaces 122A, 222A of the outer collar 10A and the inner collar 20A. The second segment 34A abuts with the second surfaces 124A, 224A of the outer collar 10A and the inner collar 20A.

Figure 5:
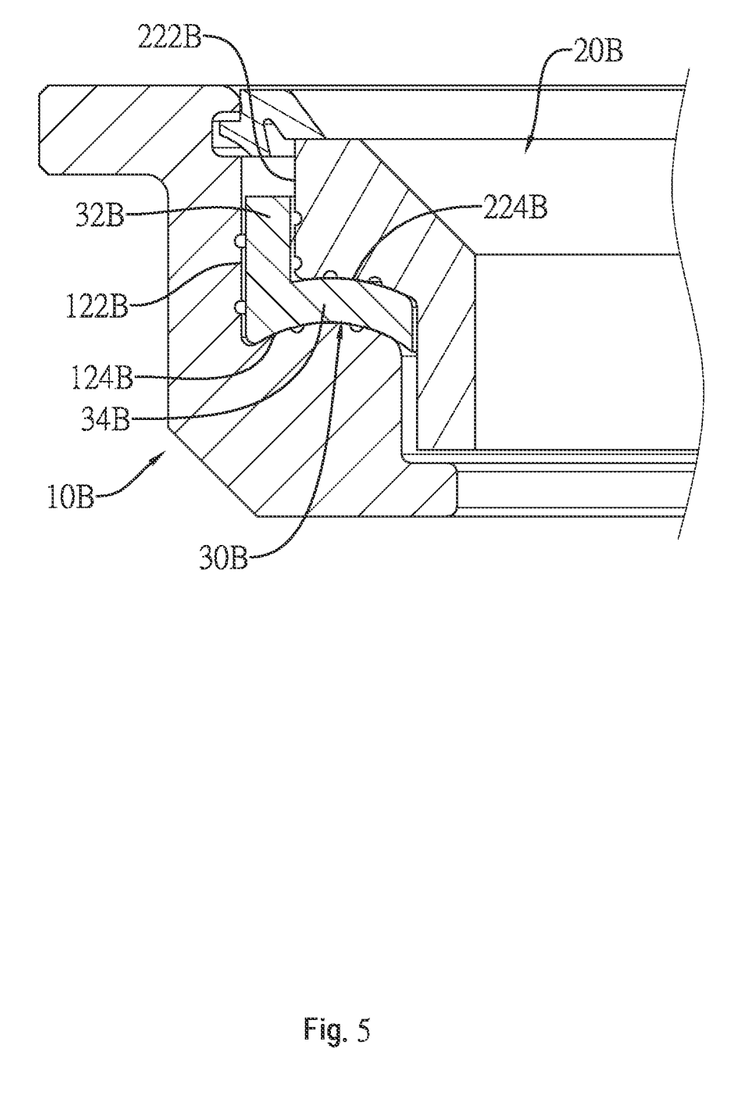
FIG. 5 is an enlarged cross sectional side view of a third embodiment in accordance with the present invention.

With reference to FIG. 5, the annular gasket has an L-shaped cross section to define a first segment 32B and a second segment 34B. The first segment 32B abuts with the first surfaces 122B, 222B of the outer collar 10B and the inner collar 20B. The second segment 34B abuts with the second surfaces 124B, 224B of the outer collar 10B and the inner collar 20B. In addition, the second surface 122B of the outer collar 10B is a convex surface, and the second surface 224B of the inner collar 20B is a concave surface. The second segment 34B of the annular gasket 30B is curved.

Figure 6:
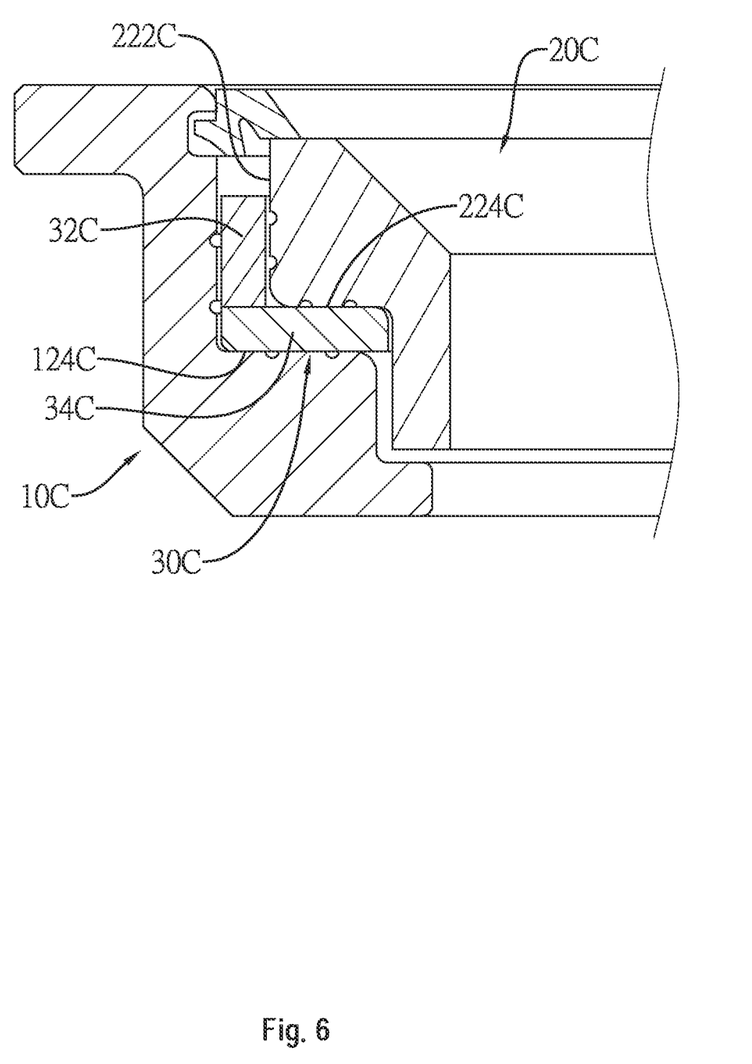
FIG. 6 is an enlarged cross sectional side view of a fourth embodiment in accordance with the present invention.

With reference to FIG. 6, the annular gasket 30C is composed of two individual parts including a first part 32C and a second part 34C. The first part 32C abuts with the first surfaces 122C, 222C of the outer collar 10C and the inner collar 20C. The second part 34C abuts with the second surfaces 124C, 224C of the outer collar 10C and the inner collar 20C.

Figure 7:
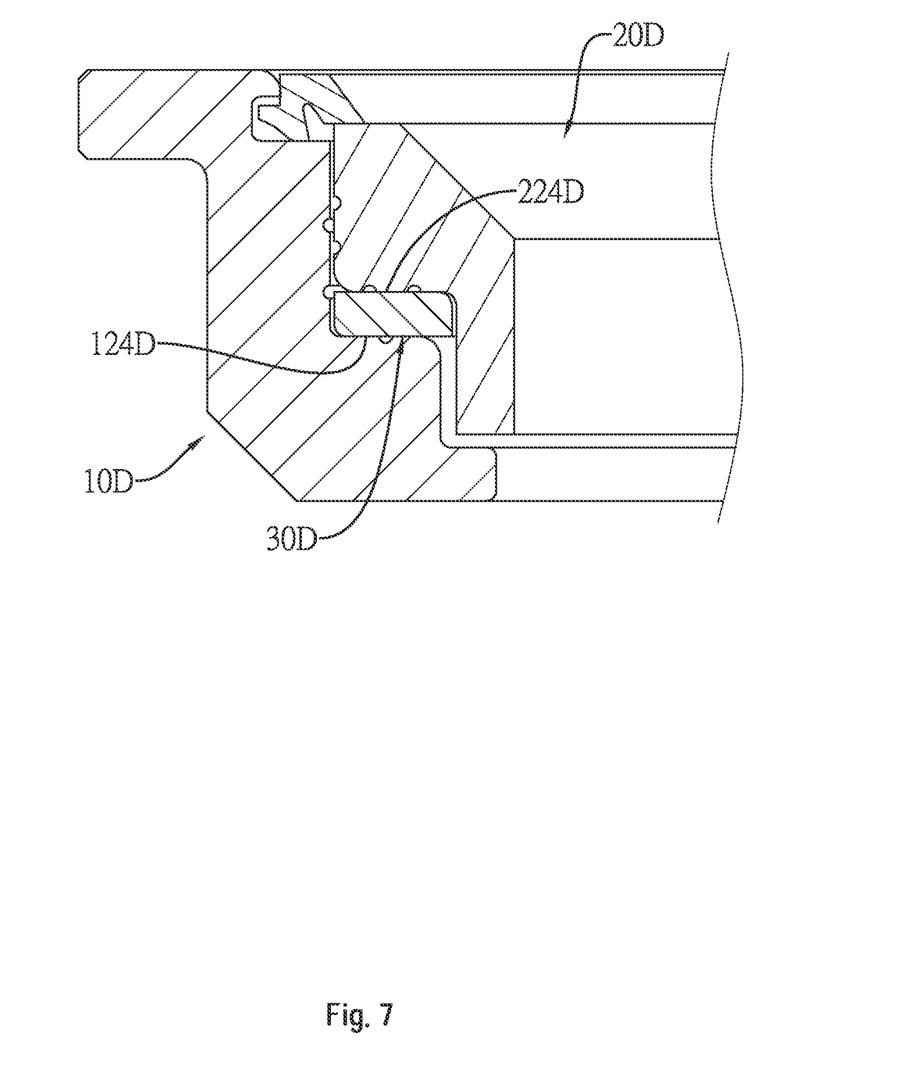
FIG. 7 is an enlarged cross sectional side view of a fifth embodiment in accordance with the present invention.

With reference to FIG. 7, the annular gasket 30D is a flat collar and abuts with the second surfaces 124D, 224D of the outer collar 10D and the inner collar 20D.

Additionally, with reference to FIG. 3, multiple annular grooves 14, 24 may be formed on the first surfaces 122, 222 or the second surfaces 124, 224 of the outer collar 10 and the inner collar 20. With the annular grooves 14, 24, lubricate oil can be held in the grooves 14, 24 and a lubricating condition is formed between the outer collar 10, the inner collar 20, and the annular gasket 30. Accordingly, the rotation between the inner collar 20 and the outer collar 10 is smooth.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A bearing for a bicycle comprising:
an outer collar-made of an outer collar material comprising one of a self-lubricating material or a metal coated with a self-lubricating coating layer;
an inner collar-made of-an inner collar material comprising a self-lubricating material or a metal coated with a self-lubricating coating layer, the inner collar mounted rotatably in the outer collar; and
an annular gasket mounted between the outer collar and the inner collar, abutting with corresponding surfaces of the outer collar and the inner collar, and made of a material having a hardness harder than a hardness of the outer collar material and the inner collar material.

2. The bearing as claimed in claim 1, wherein the outer collar has an annular recess defined in an inner-surface of the outer collar to define a substantially vertical first surface and a substantially horizontal second surface;
the inner surface of the outer collar has a third surface connected with the second surface and being substantially vertical to the second surface;
the inner collar has an annular protrusion formed around an outer-surface of the inner collar to define:
a substantially vertical first surface corresponding to the first surface of the outer collar in position; and a substantially horizontal second surface corresponding to the second surface of the outer collar in position; and the outer surface of the inner collar has a third surface connected with and being substantially vertical to the second surface of the inner collar and corresponding to the third surface of the outer collar in position.

3. The bearing as claimed in claim 2, wherein the annular gasket has a continuous bending cross section to define:
a first segment abutting with the first surfaces of the outer collar and the inner collar;
a second segment abutting with the second surfaces of the outer collar and the inner collar; and
a third segment abutting with the third surfaces of the outer collar and the inner collar.

4. The bearing as claimed in claim 3 further comprising a securing collar engaged with the inner surface of the outer collar and abutting with the inner collar.

5. The bearing as claimed in claim 2, wherein the annular gasket has an L-shaped cross section to define:
a first segment abutting with the first surfaces of the outer collar and the inner collar; and
a second segment abutting with the second surfaces of the outer collar and the inner collar.

6. The bearing as claimed in claim 5 further comprising a securing collar engaged with the inner surface of the outer collar and abutting with the inner collar.

7. The bearing as claimed in claim 5, wherein the outer collar has multiple annular grooves defined in the inner surface of the outer collar; and
the inner collar has multiple annular grooves defined in the outer surface of the inner collar.

8. The bearing as claimed in claim 2, wherein the annular gasket has an L-shaped cross section to define:
a first segment abutting with the first surfaces of the outer collar and the inner collar; and
a second segment abutting with the second surfaces of the outer collar and the inner collar;
the second surface of the outer collar is a convex surface;
the second surface of the inner collar is a concave surface; and
the second segment of the annular gasket is curved.

9. The bearing as claimed in claim 8 further comprising a securing collar engaged with the inner surface of the outer collar and abutting with the inner collar.

10. The bearing as claimed in claim 8, wherein the outer collar has multiple annular grooves defined in the inner surface of the outer collar; and
the inner collar has multiple annular grooves defined in the outer surface of the inner collar.

11. The bearing as claimed in claim 2, wherein the annular gasket is composed of two individual parts including a first part and a second part;
the first part of the annular gasket abutting with the first surfaces of the outer collar and the inner collar; and
the second part of the annular gasket abutting with the second surfaces of the outer collar and the inner collar.

12. The bearing as claimed in claim 11 further comprising a securing collar engaged with the inner surface of the outer collar and abutting with the inner collar.

13. The bearing as claimed in claim 2, wherein the annular gasket is a flat collar and abuts with the second surfaces of the outer collar and the inner collar.

14. The bearing as claimed in claim 13 further comprising a securing collar engaged with the inner surface of the outer collar and abutting with the inner collar.

15. The bearing as claimed in claim 14, wherein the outer collar has multiple annular grooves defined in the inner surface of the outer collar; and
the inner collar has multiple annular grooves defined in the outer surface of the inner collar.

16. The bearing as claimed in claim 13, wherein the outer collar has multiple annular grooves defined in the inner surface of the outer collar; and
the inner collar has multiple annular grooves defined in the outer surface of the inner collar.

17. The bearing as claimed in claim 2 further comprising a securing collar engaged with the inner surface of the outer collar and abutting with the inner collar.

18. The bearing as claimed in claim 2, wherein the outer collar has multiple annular grooves defined in the inner surface of the outer collar; and
the inner collar has multiple annular grooves defined in the outer surface of the inner collar.

* * * * *